(12) United States Patent
Hannel et al.

(10) Patent No.: US 7,194,535 B2
(45) Date of Patent: Mar. 20, 2007

(54) METHODS AND SYSTEMS FOR TESTING STATEFUL NETWORK COMMUNICATIONS DEVICES

(75) Inventors: Clifford L. Hannel, Thousand Oaks, CA (US); Douglas E. Schafer, Agoura Hills, CA (US); Errol Ginsberg, Malibu, CA (US); Gerald R. Pepper, Thousand Oaks, CA (US)

(73) Assignee: IXIA, Calabasas, CA (US)

( * ) Notice: Subject to any disclaimer, the term of this patent is extended or adjusted under 35 U.S.C. 154(b) by 599 days.

(21) Appl. No.: 09/968,432

(22) Filed: Oct. 1, 2001

(65) Prior Publication Data

US 2003/0088664 A1 May 8, 2003

(51) Int. Cl.
G06F 15/16 (2006.01)
G06F 17/50 (2006.01)
(52) U.S. Cl. .................................. 709/224; 703/13
(58) Field of Classification Search ................ 709/224, 709/227–228; 703/13–22
See application file for complete search history.

(56) References Cited

U.S. PATENT DOCUMENTS

| | | | |
|---|---|---|---|
| 5,247,517 A | 9/1993 | Ross et al. | |
| 5,343,463 A | 8/1994 | van Tetering et al. | |
| 5,477,531 A | 12/1995 | McKee | |
| 5,568,471 A | 10/1996 | Hershey et al. | |
| 5,600,632 A | 2/1997 | Schulman | |
| 5,657,438 A | 8/1997 | Wygodny | |
| 5,787,253 A | 7/1998 | McCreery et al. | |
| 5,838,919 A * | 11/1998 | Schwaller et al. | 709/224 |
| 5,881,237 A * | 3/1999 | Schwaller et al. | 709/224 |
| 5,905,713 A | 5/1999 | Anderson et al. | |
| 5,937,165 A * | 8/1999 | Schwaller et al. | 709/224 |
| 5,974,237 A | 10/1999 | Shurmer et al. | |
| 6,028,847 A | 2/2000 | Beanland | |
| 6,061,725 A * | 5/2000 | Schwaller et al. | 709/224 |
| 6,108,800 A | 8/2000 | Asawa | |
| 6,122,670 A | 9/2000 | Bennett et al. | |
| 6,157,955 A | 12/2000 | Narad et al. | |
| 6,173,333 B1 | 1/2001 | Jolitz | |
| 6,233,256 B1 | 5/2001 | Dieterich et al. | |
| 6,279,124 B1 | 8/2001 | Brouwer | |
| 6,345,302 B1 | 2/2002 | Bennett et al. | |
| 6,360,332 B1 | 3/2002 | Weinberg | |
| 6,363,056 B1 | 3/2002 | Beigi et al. | |

(Continued)

OTHER PUBLICATIONS

Business Wire. "Ixia's Web Stressing and In-Service Monitoring Products Names Best of Show Finalist at NetWorld+Interop 2001, Atlanta", Sep. 10, 2001, 2 pages.*

(Continued)

*Primary Examiner*—Jeffrey Pwu
*Assistant Examiner*—George C. Neurauter, Jr.
(74) *Attorney, Agent, or Firm*—SoCal IP Law Group LLP; Steven C. Sereboff (57) ABSTRACT

Methods and systems for testing stateful network communications devices are disclosed. According to one test method, stateful and simulated stateless sessions are established with a device under test. Packets are sent to the device under test over the stateful and stateless connections. Information received on the stateful connections is used to alter test conditions on the stateless connections. As a result, a realistic mix of network traffic can be achieved with a reduced amount of hardware.

84 Claims, 8 Drawing Sheets

U.S. PATENT DOCUMENTS

| | | | |
|---|---|---|---|
| 6,397,359 B1 * | 5/2002 | Chandra et al. | 714/712 |
| 6,408,335 B1 * | 6/2002 | Schwaller et al. | 709/224 |
| 6,421,730 B1 | 7/2002 | Narad et al. | |
| 6,434,513 B1 * | 8/2002 | Sherman et al. | 702/186 |
| 6,446,121 B1 | 9/2002 | Shah et al. | |
| 6,507,923 B1 | 1/2003 | Wall et al. | |
| 6,545,979 B1 | 4/2003 | Poulin | |
| 6,601,098 B1 | 7/2003 | Case et al. | |
| 6,625,648 B1 * | 9/2003 | Schwaller et al. | 709/224 |
| 6,625,689 B2 | 9/2003 | Narad et al. | |
| 6,662,227 B2 * | 12/2003 | Boyd et al. | 709/224 |
| 6,708,224 B1 * | 3/2004 | Tsun et al. | 719/316 |
| 6,763,380 B1 * | 7/2004 | Mayton et al. | 709/224 |
| 6,789,100 B2 | 9/2004 | Nemirovsky | |
| 6,950,405 B2 | 9/2005 | Van Gerrevink | |
| 7,006,963 B1 * | 2/2006 | Maurer | 703/21 |
| 7,010,782 B2 * | 3/2006 | Narayan et al. | 717/124 |
| 2002/0080781 A1 | 6/2002 | Gustavsson | |
| 2003/0033406 A1 * | 2/2003 | John et al. | 709/224 |
| 2003/0043434 A1 | 3/2003 | Brachmann et al. | |
| 2003/0231741 A1 | 12/2003 | Rancu et al. | |

OTHER PUBLICATIONS

Business Wire. "Spirient Communications TeraMetrics and NetIQ's Chariot Work Together to Create First Complete Network Performance Analysis Solution", Sep. 25, 2000, 2 pages.*

Business Wire. "NetIQ's Chariot 4.0 Goes Internet-Scale; ASPs and Service Providers Can Conduct Tests With Up to 10,000 Connections; New Visual Test Designer Simplifies Testing of All Sizes", Oct. 23, 2000, 1 page.*

"Caw Networks Unveils New Web-Stressing Appliance", press release from Caw Networks, Inc., Mar. 5, 2001, 2 pages.*

Lori MacVittie. "Online Only: CAW's WebReflector Makes Load-Testing a Cakewalk", Network Computing, Sep. 3, 2001, 2 pages.*

Caw Networks, Inc. and Foundry Networks, Inc. "Caw Networks Performance Brief: Caw Networks and Foundry Networks 140,000 Transactions per Second Assessment", Sep. 2001, 1 page.*

PRNewsWire. "Caw Network Doubles Performance of Real-World Capacity Assessment Applicance Suite: WebAvalanche and WebReflector Now Generate and Respond to 20,000+ HTTP requests per Second With Over One MIllion Open Connections", Sep. 10, 2001, 2 pages.*

Business Wire. "REMINDER/Caw Networks to Spotlight WebAvalanche 2.0 and WebReflector At Networld+Interop", May 8, 2001, 2 pages.*

Ron J. Kovac. "Validate your equipment performance—Netcom Systems' SmartBits—Hardware Review—Evaluation", Communications News, May 2000, 2 pages.*

The Undercover Report: JBoss 3, by Scott Crawford, Version 1.0, Jun. 4, 2003, 16 pages.

* cited by examiner

METHODS AND SYSTEMS FOR TESTING STATEFUL NETWORK COMMUNICATIONS DEVICES

TECHNICAL FIELD

The present invention relates to methods and systems for testing network communications devices. More particularly, the present invention relates to methods and systems for testing stateful network communications devices.

BACKGROUND ART

Testing high capacity, IP-based intelligent networks requires the origination of Internet-scale volumes of simulated user traffic in laboratory environments. The current generation of high-speed network performance testing equipment is based on either:

Proprietary hardware-based "packet blasters" that use pre-configuring quasi-static packets at or near "wire-speed;" or TCP socket-based software that runs on large numbers of general purpose (or slightly modified) computing platforms.

As the density, speed and intelligent traffic management capabilities of network devices increase, traditional high-volume traffic generation solutions are less able to simulate real-world scenarios.

TCP Session Characteristics

Figure 1:
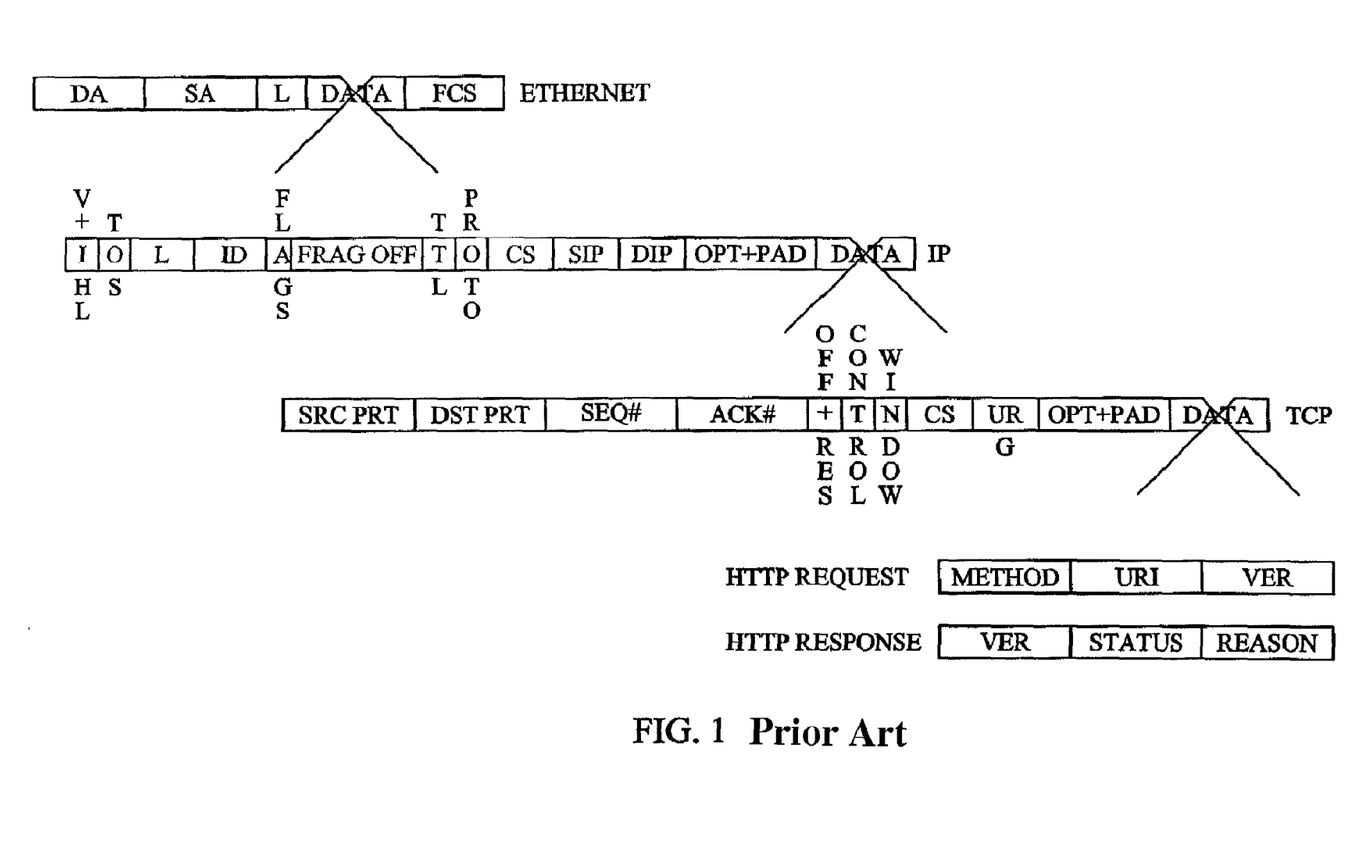
FIG. 1 is a block diagram of a packet structure for HTTP.

FIG. 1 illustrates the components of the headers in a typical HTTP request/response packet. Traditional network routing and switching devices are stateless in that these devices make decisions based on information that is contained within these headers without maintaining any information about previous packets. They do not maintain any type of connection to the client or server at either end of the TCP transaction.

In order to test a stateless device, simulated traffic only needs to look like "real" traffic on a packet-by-packet basis. There does not need to be a complex relationship between the packets, so the transmitting device does not need to maintain any state or have any dynamic behaviors. For this reason, the current generation of high performance traffic generators do not require a full TCP/IP stack for performance testing. Specialized hardware is used to generate wirespeed packets that are varied algorithmically by overlaying variable length incrementing or random patterns over a "base packet" without any consideration of received packets. These conventional stateless test devices are commonly referred to as packet blasters.

True TCP sessions contain a feedback mechanism. For example, a TCP receiver sends acknowledgement packets to a TCP sender that advertise a window size to the TCP sender that inform the TCP sender the size of the receiver's receive buffer. The sender uses the advertised window size to control the flow of packets sent to the receiver. This mechanism causes the flow of incoming traffic to vary as a function of receiver performance. For instance, as a TCP receiver becomes overloaded, the rate of removing and processing packets from its TCP receive buffer decreases. As a result, the window size advertised to the sender decreases, and the TCP sender slows the flow of packets sent to the receiver. In addition, the mechanism can generate redundant data. For example, if a TCP receiver receives an out-of-sequence packet, the receiver will send a duplicate acknowledgement to the sender indicating that an out of sequence packet was received. Because this feedback mechanism exists on every TCP connection, overall TCP session throughput becomes the dominant performance metric.

Unlike traditional switches and routers, server load-balancing (SLB) devices may maintain state. In the most basic implementations, this takes the form of "persistent sessions" where all packets from a specific user (source IP address) are routed to the same server (destination IP address). In order to accomplish this, the SLB may maintain a table of established client/server connections and look up the server to which a packet should be routed based on the client address.

The next generation of SLB devices is much more sophisticated. They may make routing decisions based on a combination of data from the IP, TCP and HTTP header (URL, Cookie) and may even actively participate in a client/server session by proxying and aggregating multiple client connections into a pool of pre-existing server connections. Since the SLB may have a full TCP/IP stack, it becomes much more difficult to test the device with stateless, algorithmically generated traffic. The performance of the SLB is sensitive to many more characteristics of the TCP session. Table 1 shown below summarizes the information in a received packet processed by various IP-based communications devices.

TABLE 1

| | Routing Device Header Awareness | | | |
|---|---|---|---|---|
| Header Field | Switch | Router | Traditional SLB | Nextgen SLB |
| MAC DA/SA | X | X | X | X |
| Ethernet FCS | X | X | X | X |
| IP DA/SA | | X | X | X |
| IP Checksum | | X | X | X |
| TCP src/dst port | | | | X |
| TCP Sequence # | | | | X |
| TCP Checksum | | | | X |
| HTTP URL | | | | X |
| HTTP Cookie | | | | X |

In Table 1, it can be seen that switches and routers only process Ethernet and IP headers, respectively. Traditional server load balancers process the IP source and destination address fields and TCP source and destination port fields. Next generation server load balancers process every header from the Ethernet header through application-level headers. As a result, these next generation devices cannot be tested using traditional stateless packet blasters.

Today's load balancing switches generally handle tens of thousands of session establishments per second with fewer than 100,000 concurrent sessions established. Moore's Law is adhered to not only in general purpose computing platforms but in network devices as well: the new generation of load balancers will handle hundreds of thousands of sessions per second with 1,000,000 or more concurrent sessions established.

While stateless hardware-based solutions cost a fraction as much as fully stateful software-based solutions for high packet rates, stateless solutions do not provide realistic enough traffic to accurately measure the performance of stateful network communications devices, such as new generation SLBs. In fact, SLB devices that proxy connections with nearly a full TCP stack will drop simulated connections attempted by such a device. At the other extreme, software-based full stack implementations are prohibitively expensive to acquire and difficult to maintain and operate for high rates and/or volumes of connections. For example, software-based full TCP stack implementations require multiple may require multiple machines with multiple processors and network interfaces to achieve the number of TCP sessions required to test a stateful network communications device, such as a server load balancer. Accordingly, there exists a long-felt need for economical methods and systems for testing stateful network communications devices capable of simulating a realistic mix of network traffic.

DISCLOSURE OF THE INVENTION

The present invention includes methods and systems for testing stateful network communications devices. Stateful network communications devices that may be tested by embodiments of the present invention include any type of device that maintains state, such stateful servers, server load balancers, firewalls, secure sockets layer (SSL) accelerators, etc. The methods and systems according to the present invention are capable of simulating a realistic mix of traffic without requiring all of the sessions or connections used in a test to be stateful. According to one exemplary method, a number of simulated stateless connections are established with a device under test. Stateful TCP/IP connections are also established with the device under test. Packets are sent to the device under test over the stateful and stateless connections. Performance and behavior measurements are taken on the stateful connections. These performance measurements are used to modify the behavior of the stateless connections in order to simulate a realistic mix of network traffic. Because the present invention does not require all of the connections to be stateful, the amount of hardware required to test a stateful network communications device is reduced.

Accordingly, it is an object of the present invention to provide improved methods and systems for testing a stateful network communications device.

It is another object of the invention to provide methods and systems for testing a stateful network communications device that use both stateful and simulated stateless connections.

It is yet another object of the present invention to provide a system for testing a stateful network communications device using a reduced amount of hardware over conventional systems.

Some of the objects of the invention having been stated hereinabove, other objects will become evident as the description proceeds when taken in connection with the accompanying drawings as best described hereinbelow.

BRIEF DESCRIPTION OF THE DRAWINGS

A description of preferred embodiments of the invention will now proceed with reference to the accompanying drawings of which:

FIG. 8 is a screen shot illustrating exemplary test results collected by a system for testing a stateful network communications device according to an embodiment of the present invention.

DETAILED DESCRIPTION OF THE INVENTION

Figure 2:
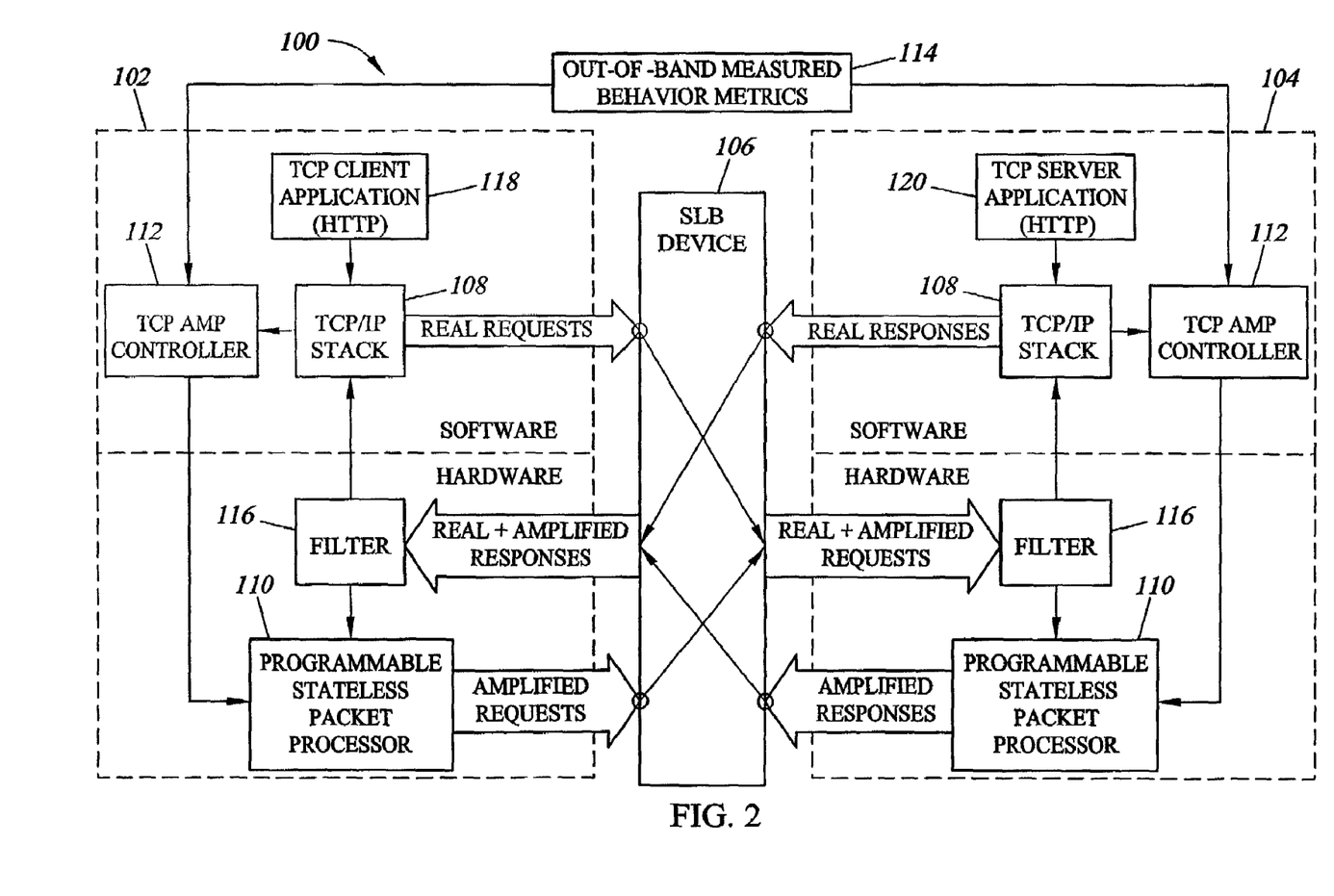
FIG. 2 is a block diagram of a system for testing a stateful network communications device according to an embodiment of the present invention.

FIG. 2 is a functional block diagram illustrating exemplary components of a system for testing a stateful network communications device according to an embodiment of the present invention. In FIG. 2, test system 100 includes a first test device 102 and a second test device 104 for testing a device under test 106. In the illustrated example, device undertest 106 is a server load balancer. Although the example illustrated in FIG. 2 includes two test devices, the present invention is not limited to using two test devices to test a server load balancer. For example, in an alternative test scenario, a single test device could be used to test a server load balancer or other device. However, using two test devices to test a server load balancer is preferred because one test device can function as a client and the other test device can function as multiple servers. In yet another alternative test scenario, one or more test devices 102 may be configured as clients and used to test the TCP functionality of a server, such as a web server.

In FIG. 2, test devices 102 and 104 each include TCP/IP stacks 108 for implementing full TCP/IP communications capabilities. By "full TCP/IP communications capabilities," it is meant that TCP/IP stacks 108 implement the full TCP protocol, including timeouts, retransmissions, flow control, etc. The TCP protocol that may be implemented by TCP/IP stacks 108 is described in IETF RFCs 675, 761, and 793, the disclosures of which are incorporated herein by reference in their entirety. The IP protocol that may be implemented by TCP/IP stacks 108 is described in IETF RFCs 760 and 791, the disclosures of which are incorporated herein by reference in their entirety. According to the present invention, data collected on full TCP/IP sessions established by TCP/IP stacks 108 will be used to modify test behavior on the simulated stateless TCP/IP connections, as will be discussed in more detail below.

The operation of TCP/IP stacks 108 can be contrasted with that of programmable stateless packet processors 110. Programmable stateless packet processors 110 simulate TCP/IP communications in a stateless manner. By "stateless," it is meant that programmable stateless packet processors 110 make response decisions based only on information contained in an inbound packet. Programmable stateless packet processors 110 preferably do not maintain any state about a connection from one packet to the next. For example, when programmable stateless processors 110 receive a SYN packet, processors 110 formulate and send a SYN plus ACK. Programmable stateless packet processors 110 preferably do not implement of the stateful procedures implemented by TCP/IP stacks 108. For example, programmable stateless packet processors 110 may not implement flow control or retransmissions, both of which require complex code and processing resources. Because programmable stateless packet processors 110 make decisions based on information in inbound packets, programmable stateless packet processors 110 are not required to maintain connection tables of open TCP sessions. The lack of connection tables greatly reduces the processing and memory required for each simulated connection over that of a full TCP/IP session or connection. As a result, TCP/IP test devices 102 and 104 can simulate more TCP/IP sessions with a reduced amount of hardware over conventional full-stack test devices while still causing the DUT to add or reference information in its own state table.

The behavior of programmable stateless packet processors 110 is preferably programmable or controllable by TCP amplification (AMP) controllers 112. TCP AMP controllers 112 receive performance metrics regarding stateful TCP connections maintained by TCP/IP stacks 108 and use this information to modify the behavior of the simulated stateless TCP connections. Performance metrics may be obtained directly from TCP/IP stacks 108 or from an external measurement device 114, such as a packet sniffer. Exemplary performance measurements that may be used include retransmission rate, fragmentation, packet sizes, drop/reset rates, and other information that requires stateful TCP session handling. These metrics can be used to change the corresponding behavior of the stateless TCP connections implemented by programmable stateless packet processors 110 to more closely simulate a realistic mix of traffic. For instance, if measurement device 114 detects that a certain percentage of TCP/IP segments are being retransmitted, TCP AMP controller 112 on test device 102 may instruct programmable stateless packet processor 110 to retransmit the same percentage of TCP segments on the stateless connections. Thus, by using data collected on the stateful connections to modify test conditions on the stateless connections, test devices 102 and 104 closely simulate live network connections.

Test devices 102 and 104 may also include filters 116 for filtering data received on stateless and stateful TCP connections. For example, filters 116 may contain tables that associate IP addresses with stateless and stateful connections. When a packet is received over one of the connections, filters 116 determine whether to send the packets to TCP/IP stack 108 or programmable stateless packet processor 110 based on the connection tables.

Test devices 102 and 104 preferably also include TCP applications 118 and 120. In the illustrated example, TCP application 118 may be a client application, such as an HTTP client application. TCP application 120 may be a TCP server, such as an HTTP server. The present invention is not limited to using HTTP to test a device under test. Any application capable of using the underlying services of TCP to send or receive data is within the scope of the invention. For example, other applications that may be used include FTP, telnet, or other stateful application.

In the example illustrated in FIG. 2, components 108, 112, and 118 are illustrated as being implemented in software, while components 110 and 116 are illustrated as being implemented in hardware. However, the present invention is not limited to such an implementation. Any of the components illustrated in FIG. 2 may be implemented in hardware, software, or a combination of hardware and software.

Figure 3:
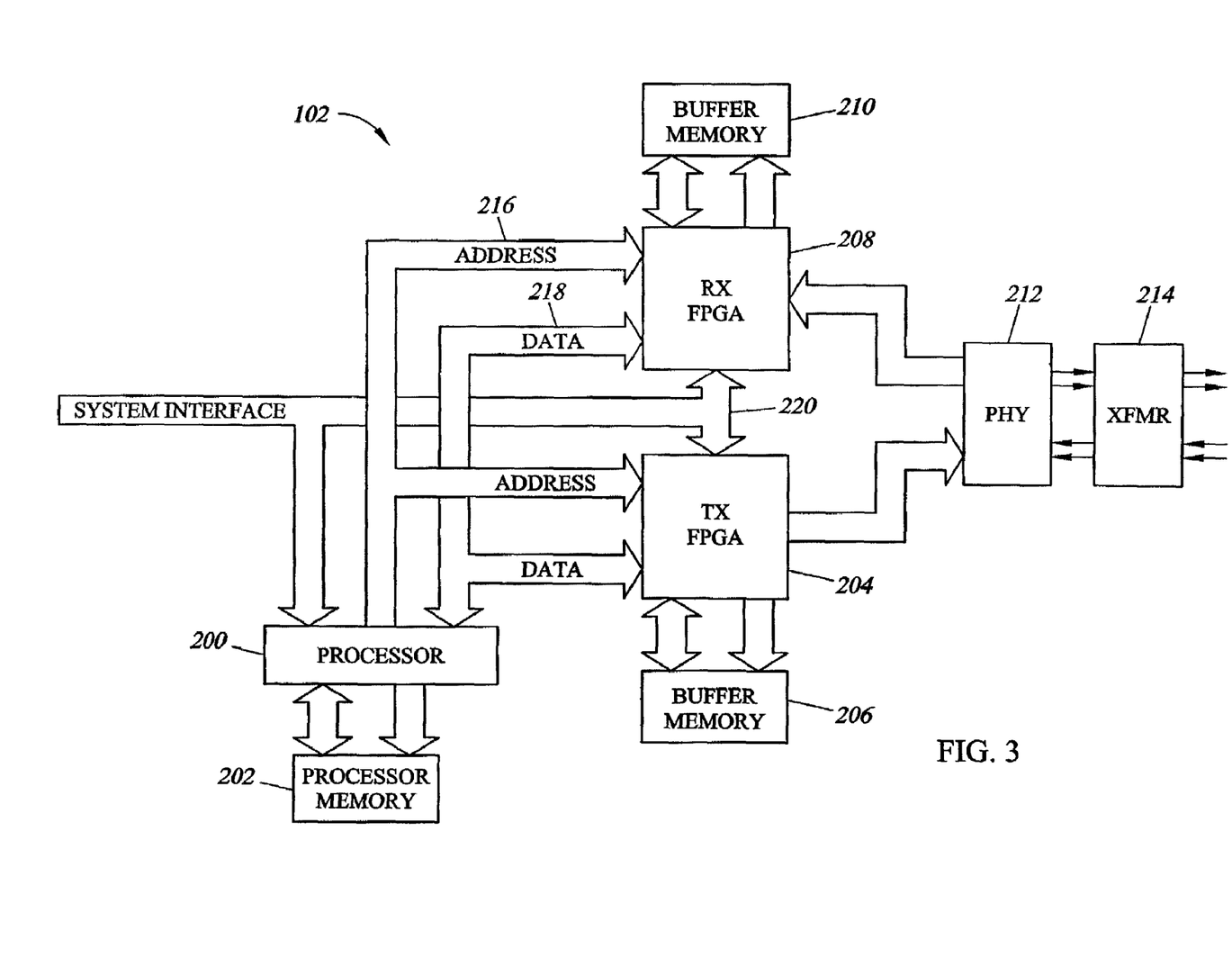
FIG. 3 is a block diagram of exemplary hardware that may be associated with a system for testing a stateful network communications device according to an embodiment of the present invention.

FIG. 3 is a block diagram of exemplary hardware for system for testing a stateful network communications device according to an embodiment of the present invention. In FIG. 3, test device 102 includes a processor 200 and processor memory 202. Components 200 and 202 may be used to run TCP/IP stacks 108, and TCP AMP controllers 112.

Transmit field programmable gate array (TX FPGA) 204 and buffer memory 206 may implement programmable stateless packet processors 110 illustrated in FIG. 2. Using an FPGA to implement programmable stateless packet processors 110 is preferred because an FPGA is capable of performing limited processing on data at much higher rates than a general-purpose processor. In addition, the behavior of an FPGA can be modified at runtime without flow interruption by an application running on a local processor or an application running on another processor via the system interface. For example, if TX FPGA 204 implements the programmable stateless packet processor 110, and TCP AMP controller is implemented on processor 200, output from TCP AMP controller 112 executing on processor 200 may be used to alter the behavior of programmable stateless packet processor 110 executing on TX FPGA 204.

In the illustrated embodiment, test device 102 includes an RX FPGA 208 and buffer memory 210. Components 208 and 210 preferably implement packet filters 116 illustrated in FIG. 2. In particular, RX FPGA 208 receives packets from the physical network interface and forwarding the packets to either programmable stateless packet processor 110 or TCP/IP stack 108. Like TX FPGA 204, RX FPGA 208 is capable of performing limited processing on data at much higher rates than a general-purpose processor. In addition, the behavior of RX FPGA 208 can be modified on the fly by an application running on a local processor or an application running on another computer via the system interface.

Physical layer chip 212 provides the physical interface for transmitting and receiving packets. The type of interface implemented by component 212 may be an electrical interface or an optical interface. For example, component 212 may implement Ethernet over a 100 Base T copper media or IP using Packet Over SONET over optical media. In the illustrated example, processor 200, TX FPGA 204, and RX FPGA 208 are connected via address lines 216, data lines 218, and a system bus 220. System bus 220 allows a host controller or client application to manage multiple ports in a coordinated fashion. For example, in an actual implementation, multiple adapter cards, each containing the multiple sets of the components in FIG. 3, may be used where each adapter has one or more physical network interfaces. The adapter cards may be plugged into a host system (chassis), which may include a general-purpose computer. TCP application 118 or 120 may execute on the embedded processor 200 or on the host system processor. Because each test device is capable of simulating real TCP connections without maintaining state, the amount of TCP connections per network interface is increased over conventional test systems. As a result, TCP/IP communications devices, such as servers and server load balancers can be tested with a reduced amount of hardware.

Figure 4:
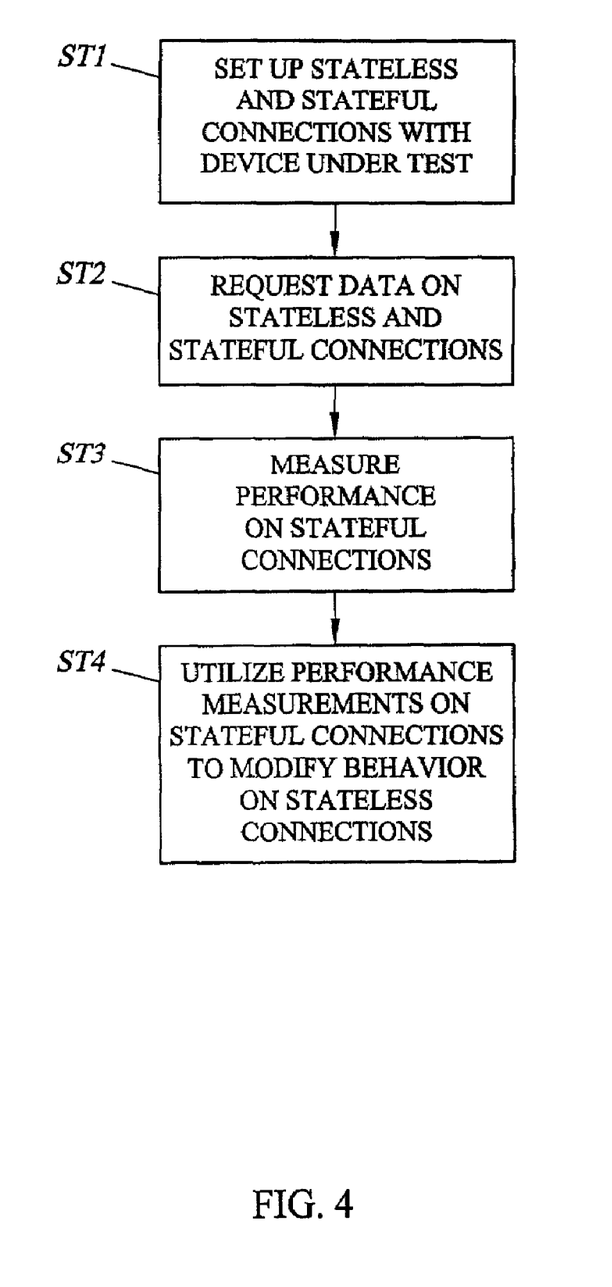
FIG. 4 is a flow chart illustrating exemplary steps for testing a stateful network communications device according to an embodiment of the present invention.

FIG. 4 is a flow chart illustrating an exemplary process for testing a stateful communications device according to an embodiment of the present invention. Referring to FIG. 4, in step ST1, stateless and simulated stateful connections are established with a device undertest. The device undertest may be any type of stateful network communications device, such as an application server or a server load balancer. If the device under test is an application server, a single test system, such as test device 102 illustrated in FIG. 2 may be configured as a client and used to establish connections with the application server. If the device under test is a server load balancer, one test device 102 may be configured as a client to establish connections with the server load balancer and another test device 104 may be configured as a server farm to receive connection requests from the server load balancer. In yet another alternative implementation, multiple test devices 102 may be used to test multiple devices under test, such as a server farm.

Stateful connections with the device under test may be established using stateful TCP connection establishment procedures as described in the above-referenced TCP/IP protocol standards documents. An exemplary procedure for establishing simulated stateless TCP/IP connections with a device under test will be described in detail below with regard to FIGS. 5 and 6.

In step ST2, test device 102 requests data on the stateless and stateful connections. If the device under test is a web server, requesting data may include requesting data using the HTTP protocol. If the device under test is a server load balancer, requesting data may include requesting data from any type of application server that may be proxied by a server load balancer. In step ST3, performance and/or behavior measurements are gathered on the stateful TCP connections. As stated above, examples of such metrics include the rate of connections being dropped, the rate of retransmissions, the rate of packets being dropped, etc. In step ST4, these measurements are used to modify the behavior of the simulated stateless connections to more closely simulate live network conditions. For example, if it is determined that packets are being retransmitted a certain rate on the stateful connections, test device 102 may be configured to retransmit packets at the same rate. If the device under test is a server load balancer and the device on the other side of the server load balancer is test device 104, programmable stateless packet processor 110 of test device 104 may be configured to retransmit data packets to test device 102. Test device 102 may be configured by its local TCP AMP controller 112 to disregard retransmitted packets.

Since programmable stateless packet processor 110 only reacts to inbound packets, some independent mechanism must be used to initiate a sequence of response packets. One method for initiating a response is by generating a "synchronous stream" of SYN packets using traditional packet-blaster capability that may be available in TX FPGA 204. This sync stream can generate packets at up to wire speed with extremely precise timing of gaps between packets (fractions of a microsecond precision). In a typical test, a sync stream will be configured to kick off the pseudo-sessions. The rate will be programmed according to the test that a user wants to perform.

One exemplary measurement that a user may want to determine in testing a device or a network is the number of sessions of a given type that can be handled at a given tolerable drop rate. For example, an SLB manufacturer might want to know how many HTTP GETs of a particular average size (or mix) can be done per second before their device starts dropping packets (due to buffers filling, for example).

The measured retransmit rate from the full stack in software can be used to change the rate of the sync stream on the stateless connections (continuously without stopping/restarting the test) until the desired drop rate is achieved (in this case, zero—but in practicality it will be some small percentage). This is much more efficient than other methods which require a linear or binary search to "home in" on the maximum rate achievable at some drop rate. A search algorithm like this would require running large numbers of tests in succession at different initial rates. The present invention thus avoids these difficulties associated with conventional test methods.

Although in the example illustrated in FIG. 4, the present invention uses measurements taken on stateful connections to modify the behavior of tests executing on stateless connections, the present invention is not limited to such an embodiment. For example, in an alternate embodiment, the present invention may include utilizing measurements taken on the stateless connections to modify the behavior of the stateless connections. In yet another alternative embodiment, the present invention may include using measurements taken on both the stateless and stateful connections to modify the behavior of the stateless connections. The behavior of the stateful connections may also be modified. Any combination of using feedback on the stateless and stateful connections to modify the behavior of the stateless and/or the stateful connections is intended to be within the scope of the invention.

Figure 5A:
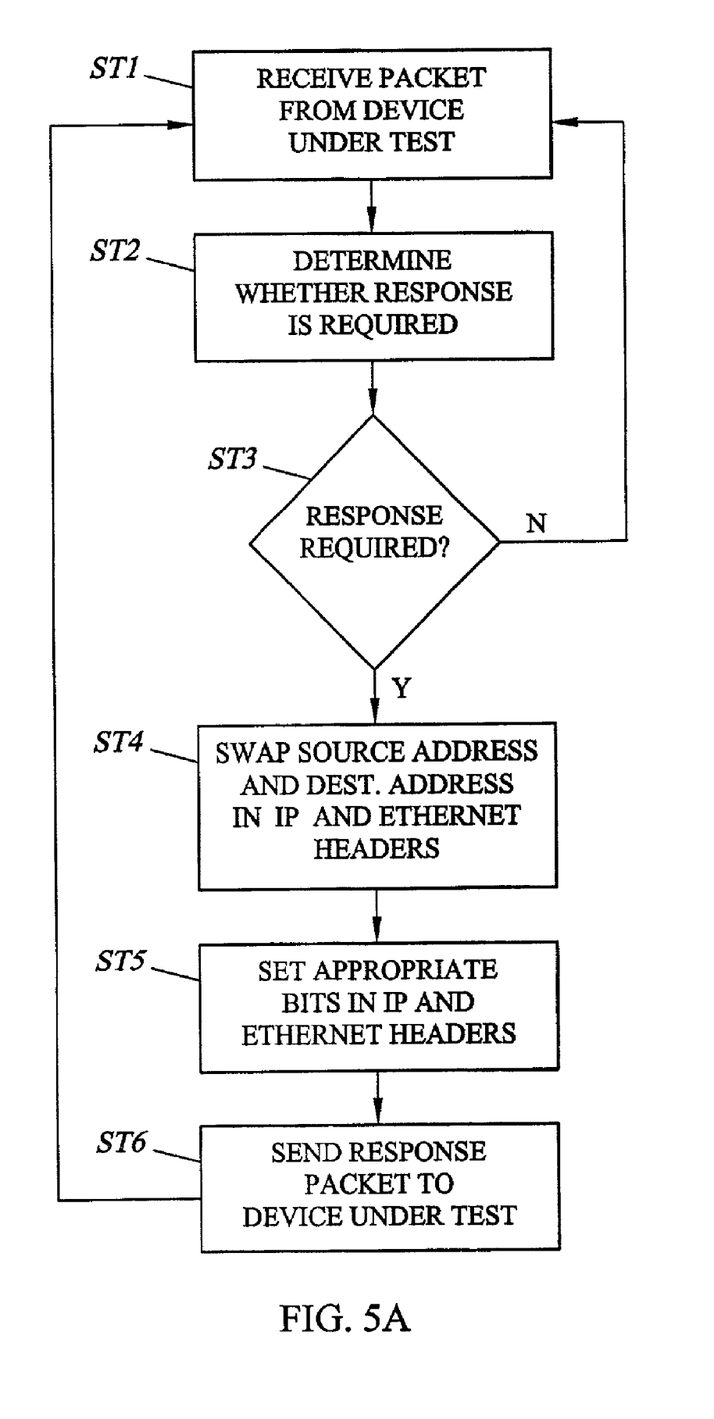
FIG. 5A is a flow chart illustrating exemplary operations performed by a programmable stateless packet processor according to an embodiment of the present invention.

In yet another alternative embodiment, the present invention may include a method and a system for testing a device under test using programmable stateless TCP processor 110 without using feedback. FIG. 5A is a flow chart illustrating exemplary operations performed by a programmable stateless packet processor according to an embodiment of the present invention. Referring to FIG. 5, in step ST1, programmable stateless packet processor 110 receives a packet from a device under test. In steps ST2 and ST3, programmable stateless packet processor 110 determines whether a response is required for the packet. For example, if the packet is a SYN packet, programmable stateless packet processor may determine that a SYN plus ACK is required in order to establish a simulated TCP connection with the device under test. If a response is not required for a received packet, control returns to step ST1 where programmable stateless packet processor 110 waits for the next packet.

If programmable stateless packet processor 110 determines that a response is required for the received packet, programmable stateless packet processor 110 prepares a response packet based on the information in the received packet. For example, in step ST4, programmable stateless packet processor 110 swaps the source and destination addresses in the IP and Ethernet headers of the received packet, assuming Ethernet is the underlying communication medium. In step ST5, programmable stateless packet processor 110 sets the appropriate bits in the TCP and network headers. This step may include computing header checksums, inserting the correct sequence number value based on the received sequence number, inserting the correct value in the TCP CODE BITS field, etc. The type of response packet may be determined based on the fields in the received packet. For example, if the CODE BITS field in the TCP header of the received packet indicates that the received packet is a SYN packet, then programmable stateless packet processor 110 changes the bits in the CODE BITS field of the outgoing packet to indicate that the packet is a SYN plus ACK. In another example, if the incoming packet contains data, programmable stateless packet processor 110 may set the appropriate bits in the CODE BITS field of the outgoing packet to indicate that the outgoing packet contains an acknowledgement.

Once the packet is constructed, in step ST6, the packet is sent to the device under test. Thus, as illustrated in FIG. 5, a programmable stateless packet processor according to an embodiment of the present invention is capable of formulating a response packet based on a receive packet without maintaining any state regarding a previously received packet.

Figure 5B:
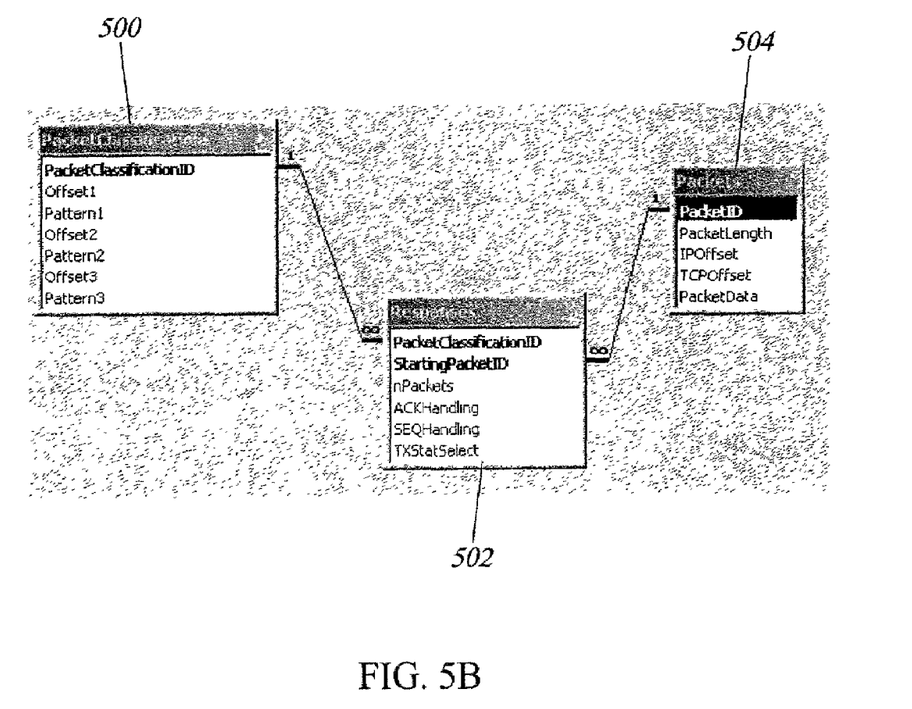
FIG. 5B is a block diagram illustrating exemplary data structures that may be used by a programmable stateless packet processor in responding to incoming packets according to an embodiment of the present invention.

In order to efficiently respond to received packets in a stateless manner, programmable stateless packet processor may utilize a number of data structures in order to classify and prepare responses to incoming packets. In one exemplary embodiment, programmable stateless packet processor 110 utilizes a packet classification table to classify incoming packets, a response table to determine responses for each packet classification, and a packets table to determine a packet format for each response type. FIG. 5B schematically illustrates exemplary data structures that may be used by programmable stateless packet processor 110 in classifying packets and determining the appropriate responses. Referring to FIG. 5B, packet classifications table 500 contains packet classification identifiers or pointers and corresponding offsets and patterns associated with each identifier. For example, packet classification table 500 may classify the following types of TCP packets:

SYN
SYNACK
ACK
ACK With GET
FIN
FINACK
RST

Packet classification table 500 may contain bit patterns and offsets for each of the above-listed packet types.

The packet classification identifiers extracted from packet classification table 500 may be used to locate responses in response table 502. There may be multiple responses in response table 502 corresponding to each packet classification type. In a situation where there are multiple responses for a given packet classification type, the responses may be ordered and programmable stateless packet processor 502 may execute the responses in sequence. In response table 502, each response may include a packet classification identifier, a starting packet identifier, the number of packets to be included in the response, and instructions for determining acknowledgement and sequence numbers to be included in the response packet.

Each packet identifier in response table 502 may be used to locate a corresponding packet template in packet table 504. Packet table 504 may contain templates for various types of response packets, such as SYN packets, ACK packets, data packets, etc. These response templates may be used to build outgoing packets based on data extracted from received packets in the manner discussed above with regard to FIG. 5A. There may be multiple packets corresponding to each packet identifier.

In operation, when programmable stateless packet processor 110 receives a packet, it searches the packet for various patterns located at various offsets according to packet classification table 502. In response to locating a matching pattern, programmable stateless packet processor 110 uses extracts the packet classification ID and uses this value to obtain a response from response table 502. Programmable stateless packet processor 110 uses information extracted from response table 502 to extract a template from packets table 504. Programmable stateless packet processor 110 then builds the packet using the extracted template. This process may be repeated for each response stored in response table 502 for the given packet type and each packet in packets table 504 until the desired packet is sent.

Figure 6:
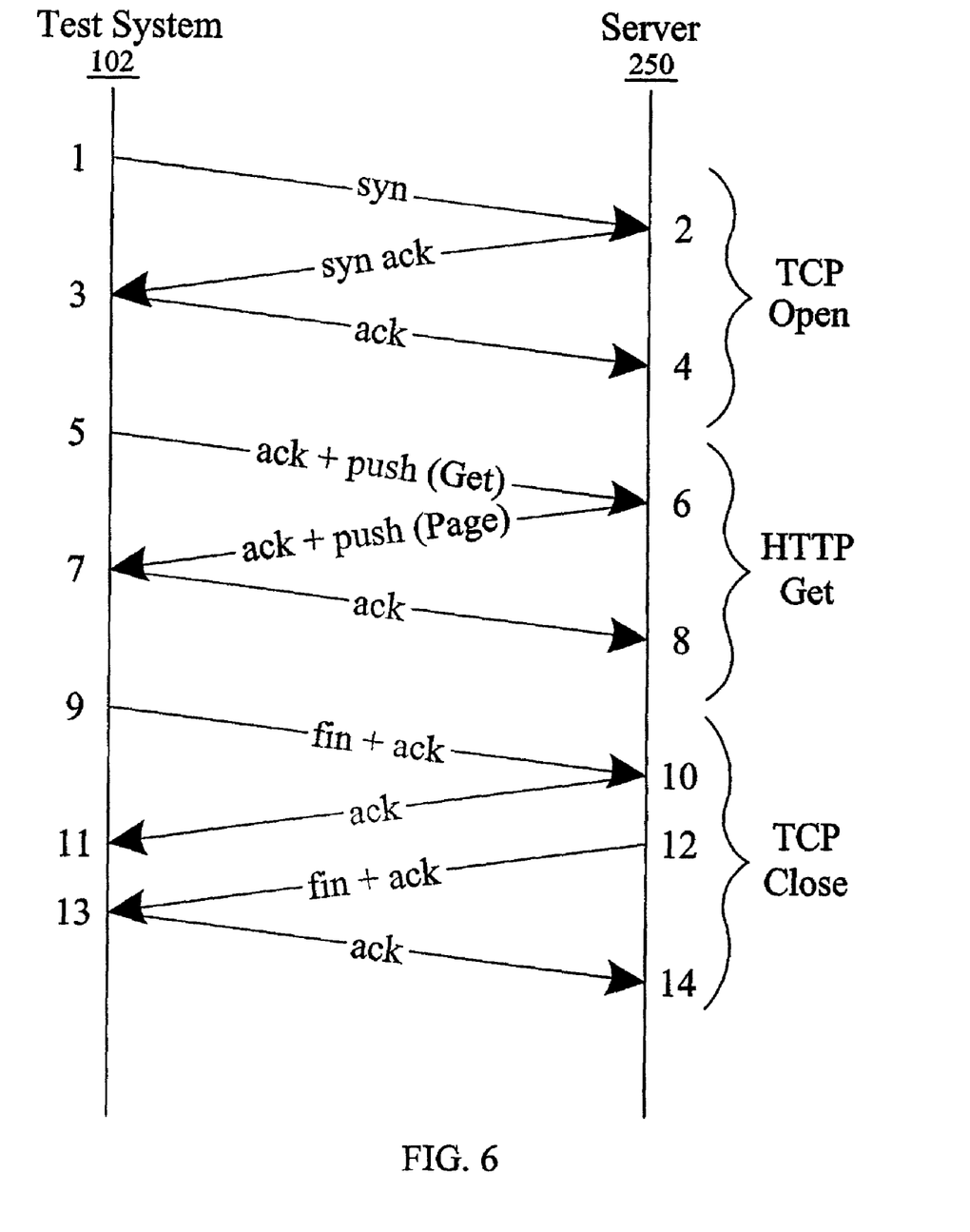
FIG. 6 is a message flow diagram illustrating exemplary messages sent between a test device and a device under test according to an embodiment of the present invention.

FIG. 6 is a message flow diagram illustrating messages that may be sent between a programmable stateless packet processor 110 of test device 102 and a server 250 in an HTTP GET transaction. In line 1 of the message flow diagram, programmable stateless packet processor 110 formulates and sends a SYN packet to server 250. Unlike a full TCP/IP client, programmable stateless packet processor of test device 102 preferably does not maintain any state about having sent the SYN packet. In line 2 of the message flow diagram, server 250 receives a SYN packet and sends a SYN plus ACK. In line 3 of the message flow diagram, programmable stateless packet processor receives the SYN plus ACK, determines that an ACK is required based only on the received packet, and sends the ACK. In line 4 of the message flow diagram, server 250 considers the connection with test device 102 to be open. Because test device 102 preferably does not maintain connection state information, test device 102 does not know whether the connection is open. However, in the scenario illustrated in FIG. 6, test device 102 assumes that the connection is open after sending the ACK in line 3.

In line 5 of the message flow diagram, programmable stateless packet processor 110 of test device 102 sends a TCP segment containing an acknowledgement plus an HTTP GET request to server 250 to request data from server 250. In line 6 of the message flow diagram, server 250 receives the HTTP GET message, extracts the requested data, and sends the requested data to test device 102. In line 7 of the message flow diagram, test device 102 receives the data and formulates a response packet based on the data packet. In this case, the response packet is an ACK packet.

In line 9 of the message flow diagram, programmable stateless packet processor 110 of test device 102 sends a FIN plus ACK packet to server 250 to initiate a connection close. In line 10 of the message flow diagram, server 250 receives the FIN and sends an ACK to the FIN. In line 11 of the message flow diagram, programmable stateless packet processor 110 of test device 102 receives the ACK. Because the ACK does not include any data in this example, programmable stateless packet processor 110 of test device 102 determines that no response is required. In line 12 of the message flow diagram, server 250, sends a FIN plus ACK packet to test device 102 to instruct the test system to close its connection. In line 13 of the message flow diagram, programmable stateless packet processor 110 of test device 102 receives the SYN plus ACK packet. Since programmable stateless packet processor 110 does not know that the connection is open, programmable stateless packet processor 110 simply sends an acknowledgement to the FIN packet. In line 14 of the message flow diagram, server 250 receives the FIN packet, and closes and releases resources for its local connection.

Multiple simulated connections and HTTP requests may be concurrently initiated with a device under test by repeating the steps illustrated in FIG. 6 for each simulated connection. Utilizing HTTP to test stateful network communications devices is desirable because HTTP is the primary protocol used by web browsers to obtain web pages on the Internet. However, as stated above, the present invention is not limited to using HTTP to test stateful network communications devices. Any stateful application may be used.

Test Scenarios

Table 2 shown below illustrates exemplary metrics that may be used to test a device under test, such as a server load balancer or an application server, such as a web server.

TABLE 2

Test Scenarios

| Metric | How Measured | Typical Values |
|---|---|---|
| Maximum concurrent sessions | Client application must generate multiple requests concurrently and/or before previous requests complete. Test system must maintain count of how many requests are outstanding (i.e.: TCP connection opened but not closed) at any instant in time. | 50,000–1,000,000 |
| Maximum sessions per second | Client application must generate large number of requests in parallel and in rapid succession. Test system must maintain count of requests and responses per second. | 10,000–250,000 |
| Maximum sessions per second as function of concurrent sessions | Perform multiple session/second tests with increasing numbers of concurrent sessions already open | Variable |

An exemplary procedure for performing each of the test metrics illustrated in Table 2 will now be described.

1. Set up client (or simulated client) applications. Enough clients must be set up to generate the maximum number of sessions/second or the total concurrent sessions, whichever is greater. For example, if general purpose PCs are being used as host processors in implementing the test, about 2,000 sessions/second will be generated by each machine using HTTP. Configuration information for this test scenario includes:
   a. IP addresses of clients
   b. Names or IP addresses of server
   c. If servers are not on same network as clients, the IP address of the gateway to be used to reach the servers from the client network
   d. The pages to be requested (for HTTP)
   e. Whether to use HTTP/1.0 (close session after each page) or HTTP/1.1 (keep session open for multiple page requests)
   f. Other application-specific information
2. Set up server applications. Enough servers must be set up to respond to the number of requests/second that will be generated or to maintain the maximum number of concurrent sessions, whichever is greater.
3. Set up instrumentation to measure all desired metrics. This may be part of client applications, server applications or a passive monitoring device.
4. Execute test.

Figure 7:
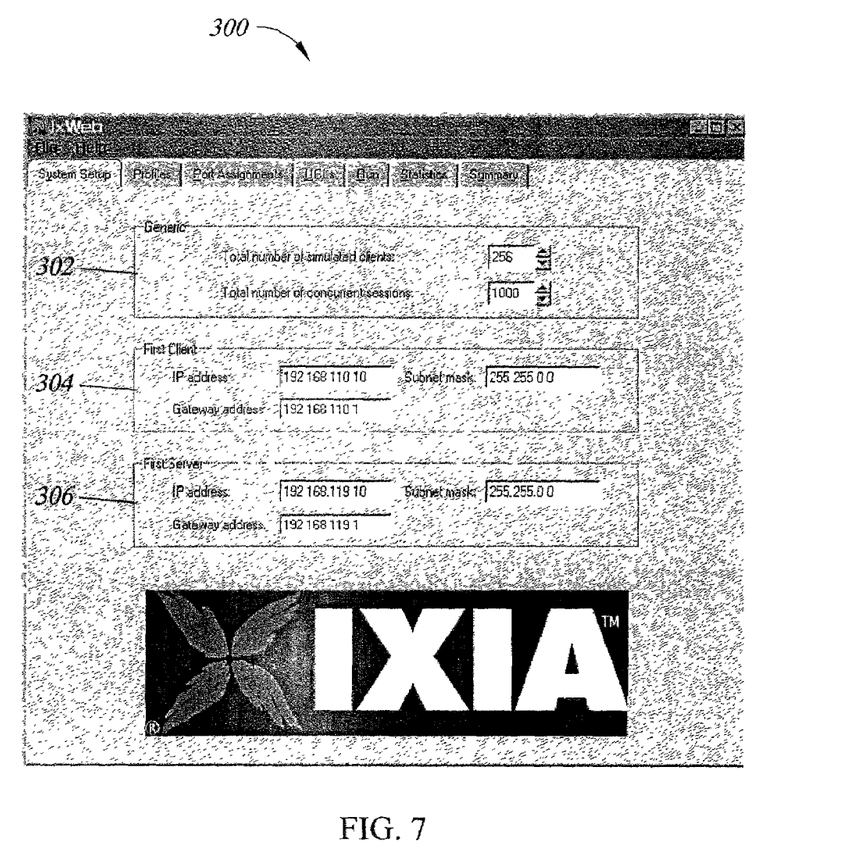
FIG. 7 is a screen shot of a configuration screen of a system for testing a stateful network communications device according to an embodiment of the present invention.

FIG. 7 is a screen shot illustrating an exemplary configuration screen of a test system according to an embodiment of the present invention. In FIG. 7, test screen 300 includes a first input area 302 allow a user to select the total number of simulated clients and the total number of concurrent sessions. Input area 304 allows the user to input the IP address, the gateway address, and the sub-net address for the first client used in the test. Input area 306 allows the user to input the IP address, gateway address, and sub-net mask of the first server to be used in the test.

A system for testing stateful network communications devices according to an embodiment of the present invention may collect and display statistics for each test performed. FIG. 8 is a screen shot illustrating exemplary connection rate data collected by a test system according to an embodiment of the present invention. In FIG. 8, the connection rate data includes page requests per second, connections requested per second, concurrent sessions, page failure responses per second, pace responses per second, and connections accepted per second. These and other measurements may be collected, displayed to the user in an easily understood format, and used to evaluate the performance of a device under test.

Performance Comparison

A system for testing a stateful network communications device according to the present invention achieves higher performance at a lower cost than conventional systems. Depending on how stateful the device being tested is, and how much of a full TCP stack it implements, there are several alternative means of generating adequate traffic to test the performance limits of the device. Each method presents a tradeoff between cost, complexity and realism. Determining which method is the least expensive acceptable method depends on validating the test results for each method against those obtained with real traffic. As will be seen in Table 3 shown below, a system for testing stateful network communications devices according to the present invention gives better performance per unit cost over conventional test systems.

TABLE 3

TCP Traffic Generation Capabilities for Various Methods

| TCP/Application Capability | Traditional Packet Blaster | HW-based Stateless Packet Processor | SW-based Stateless Packet Processor | HW/SW Hybrid Amplified TCP | CPU-based Full TCP/IP |
|---|---|---|---|---|---|
| MAC DA/SA (swap) | | X (1) | X | X | X |
| IP DA/SA (swap) | | X (1) | X | X | X |
| TCP src/dst port (swap) | | X (1) | X | X | X |
| TCP control bits (change appropriately) | | X (1, 2) | X (2) | X (4) | X |
| TCP Sequence # (compute) | | | X | X | X |
| TCP Dynamic Window Size | | | | X (4) | x |
| TCP Retransmit | | | | X (4) | x |
| Fragmentation (create/reassemble) | | | | X (4) | x |

TABLE 3-continued

TCP Traffic Generation Capabilities for Various Methods

| TCP/Application Capability | Traditional Packet Blaster | HW-based Stateless Packet Processor | SW-based Stateless Packet Processor | HW/SW Hybrid Amplified TCP | CPU-based Full TCP/IP |
|---|---|---|---|---|---|
| HTTP Get Response (static page) | | | X (3) | X (4) | x |
| HTTP Cookie (static request) | X | X | X | X | X |
| HTTP Cookie (dynamic accept/transmit) | | | | X (4) | x |
| TCP open/close per sec, per port, thousands (5) | 35 | 35 | 10 | 25 | 2 |
| Est Cost to test IM sessions/sec, $k (6) | 57 | 57 | 200 | 80 | 1000 |

(1) limitations vary by implementation
(2) fixed state sequence only
(3) limited number of static URL/page pairs
(4) not handled individually on a per-session basis
(5) on 100 mbps full duplex Ethernet link, mid-range estimate (varies by implementation & hardware)
(6) based on $2,000 per port or PC (for SW stack)

In Table 3, the second to last column includes cost and performance data for a system for testing a stateful network communications device according to an embodiment of the present invention. The remaining columns include cost and performance data for conventional test systems. It can be seen from the last row in Table 3 that the cost for testing one million sessions per second using a system for testing a stateful network communications device according to an embodiment of the present invention is $80,000 using current hardware as compared to $1 million for full TCP stack implementations. Stateless implementations, such as packet blasters are cheaper. However, as discussed above, such devices are unsuitable for testing stateful devices, such as next generation server load balancers. Thus, test systems according to embodiments of the present inventions provide the same testing functionality as full-stack devices at a much lower cost.

It will be understood that various details of the invention may be changed without departing from the scope of the invention. Furthermore, the foregoing description is for the purpose of illustration only, and not for the purpose of limitation—the invention being defined by the claims.

What is claimed is:

1. A method for testing a stateful network communications device, the method comprising:
   (a) establishing a plurality of stateful connections with a device under test;
   (b) establishing a plurality of simulated stateless connections with the device under test;
   (c) sending packets to the device under test over the stateless and stateful connections;
   (d) receiving responses from the device under test over the stateless and stateful connections;
   (e) obtaining measurements for at least one of the stateless and stateful connections; and
   (f) utilizing the measurements to change test conditions on at least one of the stateful and stateless connections.

2. The method of claim 1 wherein establishing stateful connections with a device under test includes establishing full-TCP-stack connections with the device under test.

3. The method of claim 1 wherein establishing stateful connections with a device under test includes establishing stateful connections with an application server.

4. The method of claim 1 wherein establishing stateful connections with a device under test includes establishing stateful connections with a server load balancer.

5. The method of claim 1 wherein establishing stateless connections with the device under test includes emulating TCP sequence numbering, retransmission, and flow control on a packet by packet basis on each of the stateless connections.

6. The method of claim 1 wherein sending packets to the device under test includes sending HTTP GET requests to the device under test.

7. The method of claim 6 wherein receiving responses from the device under test includes receiving HTML data from the device under test.

8. The method of claim 1 wherein obtaining measurements includes obtaining retransmission rates for the stateful connections and wherein utilizing the measurements to change test conditions includes varying the number of stateless connections attempted per unit time based on the retransmission rate.

9. The method of claim 1 wherein obtaining measurements includes obtaining connection drop rates for the stateful connections and wherein utilizing the measurements includes increasing the number of simulated stateless connections until the drop rate on the stateful connections exceeds a threshold.

10. The method of claim 1 wherein obtaining measurements includes obtaining retransmission rates for the stateful connections and wherein utilizing the measurements includes retransmitting packets over the stateless connections using the measured retransmission rates.

11. A method for testing a stateful network communications device, the method comprising:
    (a) establishing a plurality of simulated stateless connections with a device under test;
    (b) receiving packets from the device under test over the simulated stateless connections; and (c) preparing response packets based only on information in the received packets without maintaining state from one received packet to the next.

12. The method of claim 11 wherein establishing a plurality of simulated stateless connections includes establishing a plurality of simulated stateless TCP connections with the device under test.

13. The method of claim 12 wherein establishing simulated stateless TCP connections with the device under test includes establishing the simulated TCP connections without maintaining TCP establishment connection state information but forcing the device under test to add state information to its table.

14. The method of claim 12 wherein establishing simulated stateless connections with a device under test includes establishing simulated stateless connections with an application server.

15. The method of claim 12 wherein establishing simulated stateless connections with a device under test includes establishing simulated stateless connections with a server load balancer.

16. A system for testing a stateful network communications device, the system comprising:
(a) a stateful protocol stack for establishing stateful connections with a device under test;
(b) a programmable stateless packet processor for establishing simulated stateless connections with the device under test; and
(c) a controller for utilizing measurements obtained from at least one of the stateful and stateless connections to modify test conditions on at least one of the stateful and stateless connections.

17. The system of claim 16 wherein the stateful protocol stack comprises a TCP/IP protocol stack.

18. The system of claim 16 wherein the programmable stateless packet processor is adapted to establish simulated TCP connections with the device under test.

19. The system of claim 18 wherein the programmable stateless packet processor is adapted to simulate TCP connection establishment and termination without maintaining state.

20. The system of claim 18 wherein the programmable stateless packet processor is adapted to establish simulated stateless TCP connections at a first rate and the controller is adapted to vary the first rate based on the measurements obtained from the stateful connections.

21. The system of claim 16 wherein the programmable stateless packet processor is adapted to test a maximum number of sessions per unit time of the device under test.

22. The system of claim 16 wherein the programmable stateless packet processor is adapted to test a maximum number of concurrent sessions of the device under test.

23. The system of claim 16 wherein the programmable stateless packet processor is adapted to test a maximum number of sessions per unit time as a function of concurrent sections of the device under test.

24. The system of claim 16 wherein the programmable stateless packet processor and the controller are implemented in hardware and the stateful protocol stack is implemented in software.

25. The system of claim 16 comprising an application for sending and receiving data over the stateless and stateful connections.

26. The system of claim 16 comprising a filter for receiving data from the stateful and stateless connections and for determining whether to send the data to the stateful protocol stack or the programmable stateless packet processor.

27. A system for testing a stateful network communications device, the system comprising:
(a) a processor for establishing stateful connections with a device under test;
(b) a first gate array for establishing a plurality of stateless connections with the device under test and for sending data over the stateless and stateless connections; and
(c) a second gate array for receiving data over the stateful and stateless connections, wherein the first and second gate arrays are dynamically programmable to change test conditions on at least one of the stateless and stateful connections based on measurements taken on at least one of the stateless and stateful connections.

28. The system of claim 27 wherein the processor is adapted to establish TCP connections with the device under test.

29. The system of claim 28 wherein the processor is adapted to establish TCP connections with a server load balancer.

30. The system of claim 28 wherein the processor is adapted to establish TCP connections with an application server.

31. The system of claim 27 wherein the processor is adapted to dynamically modify the behavior of the gate arrays based on the performance of the stateful connections.

32. The system of claim 27 wherein the first gate array is adapted to establish simulated TCP connections with the device under test.

33. The system of claim 27 comprising a network interface coupled to the first and second gate arrays for sending and receiving data over a physical medium.

34. The system of claim 33 wherein the network interface comprises an electrical interface.

35. The system of claim 33 wherein the network interface comprises an optical interface.

36. The system of claim 27 comprising a measurements device for obtaining measurements on the stateless and stateful connections.

37. A stateless packet processor comprising:
(a) a packet classification table containing packet classification rules for statelessly classifying incoming packets and obtaining a packet type identifier for each incoming packet;
(b) a response table containing responses corresponding to the packet type identifiers stored in the packet classification table, each response containing one or more packet identifiers;
(c) a packet table containing packet templates corresponding to the packet identifiers stored in the packet table; and
(d) a processor for statelessly preparing response packets based on received packets using data stored in the packet classification table, the response table, the received packets and the packet table.

38. The stateless packet processor of claim 37 further comprising a partial TCP stack.

39. The stateless packet processor of claim 37 wherein the stateless packet processor is adapted to establish simulated TCP connections.

40. The stateless packet processor of claim 37 wherein the stateless packet processor is adapted to simulate TCP connection establishment and termination without maintaining state.

41. The stateless packet processor of claim 37 wherein the stateless packet processor is adapted to establish simulated stateless TCP connections having a rate, wherein the rate is variable to more closely simulate live connections.

42. The stateless packet processor of claim 37 wherein the stateless packet processor is adapted to test a maximum number of sessions per unit time.

43. The stateless packet processor of claim 37 wherein the stateless packet processor is adapted to test a maximum number of concurrent sessions.

44. The stateless packet processor of claim 37 wherein the stateless packet processor is adapted to test a maximum number of sessions per unit time as a function of concurrent sessions.

45. The method for testing a stateful network communications device of claim 11 further including establishing additional simulated stateless connections with the device under test until a drop rate on the simulated stateful connections exceeds a threshold.

46. An apparatus for testing a stateful network communications system, the apparatus comprising a packet processor, the packet processor comprising:
    hardware and software for establishing plural simulated stateless connections with the stateful network communications system
    hardware and software for receiving packets from the stateful network communications system over the simulated stateless connections
    hardware and software for preparing response packets for transmission to the stateful network communications system based only on information in the received packets without maintaining state from one received packet to the next.

47. The apparatus for testing a stateful network communications system of claim 46 wherein the simulated stateless connections include TCP connections.

48. The apparatus for testing a stateful network communications system of claim 46 further comprising a partial TCP/IP stack.

49. The apparatus for testing a stateful network communications system of claim 46 further including hardware and software for establishing additional simulated stateless connections with the stateful network communications system until a drop rate on the simulated stateful connections exceeds a threshold.

50. A method for testing stateful network communications, the method comprising:
    providing a packet classification table containing packet classification rules for statelessly classifying incoming packets and obtaining a packet type identifier for each incoming packet
    providing a response table containing responses corresponding to the packet type identifiers stored in the packet classification table, each response containing one or more packet identifiers
    providing a packet table containing packet templates corresponding to the packet identifiers stored in the packet table; and
    statelessly preparing response packets based on received packets using data stored in the packet classification table, the response table, the received packets and the packet table.

51. The method for testing stateful network communications of claim 50 further comprising providing a partial TCP stack.

52. The method for testing stateful network communications of claim 50 further comprising establishing simulated TCP connections.

53. The method for testing stateful network communications of claim 50 further comprising simulating TCP connection establishment and termination without maintaining state.

54. The method for testing stateful network communications of claim 50 further comprising establishing simulated stateless TCP connections having a rate, wherein the rate is variable to more closely simulate live connections.

55. The method for testing stateful network communications of claim 50 further comprising testing a maximum number of sessions per unit time.

56. The method for testing stateful network communications of claim 50 further comprising testing a maximum number of concurrent sessions.

57. The method for testing stateful network communications of claim 50 further comprising testing a maximum number of sessions per unit time as a function of concurrent sessions.

58. A method for testing stateful network communications by a network test system, the method comprising:
    requesting data on plural connections between the network test system and a stateful network communications system
    receiving inbound packets from the stateful network communications system on the connections
    after receiving the inbound packets from the stateful network communications system, preparing respective response packets based only on information in the respective inbound packets without maintaining state from one received packet to the next.

59. The method for testing stateful network communications by a network test system of claim 58 further comprising modifying a behavior of the connections to more closely simulate live network conditions.

60. The method for testing stateful network communications by a network test system of claim 58 wherein the network test system comprises a single test device.

61. The method for testing stateful network communications by a network test system of claim 58 wherein the stateful network communications system comprises a server farm.

62. The method for testing a stateful network communications system of claim 58 further comprising establishing additional simulated stateless connections with the stateful network communications system until a drop rate on the simulated stateful connections exceeds a threshold.

63. A network test system for testing stateful network communications, the method comprising:
    hardware and software for requesting data on plural connections with a stateful network communications system
    hardware and software for receiving inbound packets from the stateful network communications system on the connections
    hardware and software for, after receiving the inbound packets from the stateful network communications system, preparing respective response packets based only on information in the respective inbound packets without maintaining state from one received packet to the next.

64. The network test system for testing stateful network communications of claim 63 further comprising hardware and software for modifying a behavior of the connections to more closely simulate live network conditions.

65. The network test system for testing stateful network communications of claim 63 comprising a single test device.

66. A network test system for simulating TCP communications in a stateless manner, the network test apparatus comprising:
- a processor
- a buffer memory
- wherein the processor and the buffer memory implement
  - a programmable stateless packet processor comprising a partial TCP stack, the programmable stateless packet processor for
    - establishing simulated stateless TCP connections
    - making response decisions in the simulated stateless TCP connections based only on information contained in inbound packets for the respective simulated TCP connections and without flow control, retransmissions, or connection tables of open TCP sessions.

67. The network test system for simulating TCP communications in a stateless manner of claim 66 consisting of a single test device.

68. The network test system for simulating TCP communications in a stateless manner of claim 66 further comprising a TCP amplification controller coupled to the processor, the TCP amplification controller for modifying a behavior of the simulated stateless TCP connections.

69. The network test system for simulating TCP communications in a stateless manner of claim 66 further comprising a partial TCP stack.

70. The network test system for simulating TCP communications in a stateless manner of claim 66 wherein the simulated stateless TCP connections have a rate, the programmable stateless packet processor is further for varying the rate to more closely simulate live connections.

71. The network test system for simulating TCP communications in a stateless manner of claim 66 wherein the programmable stateless packet processor is further for increasing a number of sessions per unit time until a maximum is reached.

72. The network test system for simulating TCP communications in a stateless manner of claim 66 wherein the stateless packet processor is further for increasing a number of concurrent sessions until a maximum is reached.

73. The network test system for simulating TCP communications in a stateless manner of claim 66 wherein the stateless packet processor is further for increasing a number of sessions per unit time as a function of concurrent sessions until a maximum is reached.

74. A method for simulating TCP communications in a stateless manner, the method comprising:
- establishing simulated stateless TCP connections
- making response decisions in the simulated stateless TCP connections based only on information contained in inbound packets for the respective simulated TCP connections and without flow control, retransmissions, or connection tables of open TCP sessions.

75. The method for simulating TCP communications in a stateless manner of claim 74 further comprising modifying a behavior of the simulated stateless TCP connections.

76. The method for simulating TCP communications in a stateless manner of claim 74 wherein the simulated stateless TCP connections have a rate, the method further comprising varying the rate to more closely simulate live connections.

77. The method for simulating TCP communications in a stateless manner of claim 74 further comprising increasing a number of sessions per unit time until a maximum is reached.

78. The method for simulating TCP communications in a stateless manner of claim 74 further comprising increasing a number of concurrent sessions until a maximum is reached.

79. The method for simulating TCP communications in a stateless manner of claim 74 further comprising increasing a number of sessions per unit time as a function of concurrent sessions until a maximum is reached.

80. A method for determining how many sessions of a given type that a network communications system can handle at a given tolerable drop rate, the method comprising:
- providing a network test system
- causing the network test system to establish a first stream representing plural stateful connections with the network communications system, the stream having a data rate
- causing the network test system to establish a second stream representing plural stateless connections with the network communications system, the second stream having a sync rate
- measuring a retransmit rate of the stateful connections
- continuously changing the sync rate of the second stream of the stateless connections until the given tolerable drop rate is achieved.

81. An apparatus for testing a stateful network communications system comprising:
- first means for establishing plural simulated stateless connections with the stateful network communications system
- second means for receiving packets from the stateful network communications system over the simulated stateless connections
- third means for preparing response packets for transmission to the stateful network communications system based only on information in the received packets without maintaining state from one received packet to the next.

82. The apparatus for testing a stateful network communications system of claim 81 wherein the simulated stateless connections include TCP connections.

83. The apparatus for testing a stateful network communications system of claim 81 further comprising a partial TCP/IP stack.

84. The apparatus for testing a stateful network communications system of claim 81 further including fourth means for establishing additional simulated stateless connections with the stateful network communications system until a drop rate on the simulated stateful connections exceeds a threshold.

* * * * *